United States Patent
Wat et al.

(10) Patent No.: US 8,468,341 B2
(45) Date of Patent: Jun. 18, 2013

(54) SYSTEM AND METHOD FOR CONTENT DISTRIBUTION WITH BROADCAST ENCRYPTION

(75) Inventors: Yiu-Wing Wat, Hong Kong (HK); Zhibin Lei, Hong Kong (HK)

(73) Assignee: Hong Kong Applied Science and Technology Research Institute Company Limited (HK)

( * ) Notice: Subject to any disclaimer, the term of this patent is extended or adjusted under 35 U.S.C. 154(b) by 343 days.

(21) Appl. No.: 12/397,635

(22) Filed: Mar. 4, 2009

(65) Prior Publication Data
US 2010/0228972 A1    Sep. 9, 2010

(51) Int. Cl.
*H04L 9/00* (2006.01)
(52) U.S. Cl.
USPC .............................. 713/163; 713/168; 705/51
(58) Field of Classification Search
USPC .............................. 713/163, 168; 705/51, 67
See application file for complete search history.

(56) References Cited

U.S. PATENT DOCUMENTS

| | | | |
|---|---|---|---|
| 5,878,135 A | 3/1999 | Blatter et al. | |
| 6,839,436 B1 | 1/2005 | Garay et al. | |
| 7,419,097 B2 * | 9/2008 | Lee et al. | 235/462.11 |
| 2006/0177066 A1 * | 8/2006 | Han et al. | 380/277 |
| 2008/0010242 A1 | 1/2008 | Jin et al. | |
| 2008/0046730 A1 | 2/2008 | Han et al. | |
| 2008/0085005 A1 | 4/2008 | Jung et al. | |
| 2008/0184334 A1 * | 7/2008 | Hebert et al. | 726/1 |

OTHER PUBLICATIONS

Dan Bonen, Craig Gentry, "Collusion Resistant Broadcast Encryption With Short Ciphertexts and Private Keys", Cryptology ePrint Archive, Report 2005/018, http://eprint.iacr.org.

Ratna Dutta, Rana Barua, Palash Sarkar, "Pairing-Based Cryptographic Protocols: A Survey", Cryptology ePrint Archive, Report 2004/064, http://eprint.iacr.org.

* cited by examiner

*Primary Examiner* — Jung Kim
*Assistant Examiner* — Ayoub Alata
(74) *Attorney, Agent, or Firm* — Ella Cheong Hong Kong; Sam T. Yip; Margaret A. Burke (57) ABSTRACT

The claimed invention relates to system and method for providing encrypted content via a distribution network 630 with efficient key distribution and distribution network assignment. The claimed invention assigns users to content-specific distribution network in which the content is broadcast. This makes the content access much more efficient by conducting the authorization at the time of joining the content-specific distribution network and providing the content to entitled users through broadcasting. The claimed invention provides additional security by removing a user from the content-specific distribution network when his entitlement is no longer valid.

20 Claims, 10 Drawing Sheets

At a first time instance:

Figure 10A

At a second time instance:

Figure 10B

SYSTEM AND METHOD FOR CONTENT DISTRIBUTION WITH BROADCAST ENCRYPTION

RELATED APPLICATION

There are no related applications.

TECHNICAL FIELD

The claimed invention relates generally to a network, in particular, a computer network or a broadcast network such as TV. The claimed invention further relates to content distribution in a network. In particular, the claimed invention relates to digital rights management for content distribution.

SUMMARY OF THE INVENTION

In a network, there are computers or any kind of storage means which contains various content. If a user of this network needs the content, the user can get it from theses computers or storage means through the network. Generally speaking, in a Peer-to-Peer (P2P) network, any computer can be the content provider and other computers will access such content provider for the content. In a client-server network, some computers are servers while some computers are clients. Usually the servers are the content providers whereas the clients are the content users.

In case of content access when a client would like to access a content which is stored in a server, for example, a client would like to view a video which a server contains, the client needs the right to do so because the content may not be freely available for all. The client needs to provide certain proof to the server that specific client is entitled for the content access.

Instead of presenting the proof, i.e. the entitlement, to access the content on a server, one of the existing solutions is to broadcast the content to all and only those entitled parties can view the broadcast information. This is similar to a broadcast network where information is broadcast to all, for example, a TV broadcast. However, the major difference between the two is only the entitled parties are able to view the content but a TV broadcast network allows all to get the broadcast information.

In order to authorize entitled parties to access the broadcast information but not those who are not entitled, one possible solution is to send entitlement from server to client so that after obtaining such an entitlement, a client security module at the client side can use the entitlement to determine if the client can view that broadcast information. However, this is still incapable of restricting the broadcast information to entitled parties only.

In the claimed invention, to reduce unnecessary network traffic and the risk of having the broadcast information seized by undesired parties, the entitlement will only be broadcast to those clients that are entitled. The entitlement is no longer required to be transmitted from the server to the client such as a decoder or a set-top box. The claimed invention also provides a method for determining the entitlement in the network.

Existing broadcast encryption patents are focused in satellite and TV type broadcast system which the system cannot differentiate recipients. Our broadcast system is applicable to distribution network on internet so that it can be controlled who join the distribution network. Example of such distribution network is a P2P network.

Unlike satellite and TV broadcast systems where the system cannot differentiate among recipients, the claimed invention is applicable to any distribution network in the internet so that only authorized parties can join the distribution network and only those who join the distribution network are entitled to the content.

The claimed invention broadcast the entitlements only to the entitled parties. In case of a P2P network, the entitlements are broadcast to those parties which are authorized to join the P2P network. Furthermore, the P2P network can be dedicated to specific content so that those subscribers who are assigned to such network can access that particular content only, then such P2P network is also known as a content specific distribution network. Subsequently, the content will be broadcast to the entitled parties.

The claimed invention uses broadcast encryption, in particular, the cryptographic algorithm in use is the Boneh-Bentry-Waters scheme. The Bonch-Bentry-Waters scheme is disclosed in "*Collusion Resistant Broadcast Encryption With Short Ciphertexts and Private Keys*" by Dan Boneh, Craig Gentry and Brent Waters, 2005. The claimed invention is implemented in a distribution network regardless of whether it is a peer-to-peer network or any content distribution network, and assigning a device to a distribution network according to the subscribed content. For the implementation of the claimed invention, the broadcast encryption does not require any tree structure to save the computing time and be more efficient.

Furthermore, the claimed invention adopts a broadcast encryption method which is far more efficient. This is because, unlike the cryptography which uses a tedious group key communication protocol, the claimed invention pre-computes the keys at the server side and allows clients to compute the new key without any communication, reducing a lot of traffic within the group.

The claimed invention also eliminates the need of computing multiplication with the size of the total number of subscribers by grouping the public values. Therefore, a large volume of multiplication need not be performed while saving plenty of time and computing power.

The claimed invention relates to real time streaming content distribution and uses broadcast encryption (BE) to generate private keys and public keys. Subscribers and/or set-top boxes are mapped to content broadcast encryption private key. Each subscriber is mapped to one private key. Each private key is different from one another. The public values are grouped for easier computation. The claimed invention further relates to the distribution mechanism of private keys and public values as well as assignment of distribution network according to content.

Furthermore, the claimed invention provides additional security in certain embodiments by removing a user from the content-specific distribution network when his entitlement is no longer valid.

It is an object of this invention to use Boneh-Bentry-Waters scheme to distribute content to designated subscribers through broadcasting.

It is a further object of this invention to encrypt the content with a periodically changing session key.

It is a further object of this invention that subscribers are authenticated before joining the distribution network.

It is a further object of this invention that subscribers are required to pay before being allowed to view the content.

Other aspects of the claimed invention are also disclosed.

BRIEF DESCRIPTION OF THE DRAWINGS

These and other objects, aspects and embodiments of this claimed invention will be described hereinafter in more details with reference to the following drawings, in which:

DETAILED DESCRIPTION OF THE INVENTION

Figure 1:
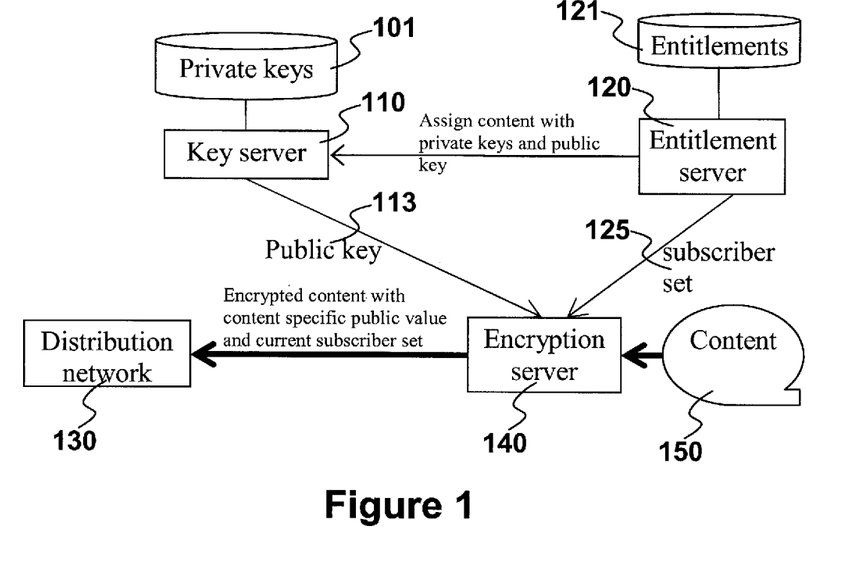
FIG. 1 shows a block diagram of encrypting a streaming content.

FIG. 1 shows a block diagram of encrypting a streaming content.

The key server 110 generates private keys. The key server 110 generates public key 113. According to a public value, the key server 110 generates a set of private keys and a public key 113. The set of private keys 101 and the public key 113 are stored in one or more databases of the key server 110. The key server provides the public key 113 to the encryption server 140.

The entitlements 121 record which content a subscriber is entitled to. The entitlements 121 are stored in a database of the entitlement server 120. According to the entitlements 121, the entitlement server 120 assigns a content with a set of a public key 113 and one or more private keys 101. The entitlement server 120 provides the subscriber set 125, S, to the encryption server 140. The subscriber set 125 indicates which subscribers are allowed to view this broadcast. For example, if the subscriber set 125 is a linked list of 1, 4, 76, 199, then the subscriber set 125 indicates subscribers #1, #4, #76, and #199.

The encryption server 140 uses the content specific private key and the subscriber set 125 to encrypt the content 150. The encryption server 140 then output the encrypted content with content specific public value γ and current subscriber set 125 to the distribution network 130. The content specific public value γ is a prime number. The current subscriber set 125 and the content specific public value γ are distributed via in-band interleaving with the content. In another embodiment, the current subscriber set 125 and the content specific public value γ are distributed via out-of-band channel, for example, by a session description protocol or in a separate authenticated channel.

The encryption server 140 performs a broadcast encryption, encrypting the content 150 for a distribution network 130. The encryption server 140 uses the subscriber set to generate a message encryption key. It then uses the message encryption key to encrypt the clear content and output encrypted content to the distribution network. In general, for the broadcast encryption, what the encryption algorithm requires includes Setup(n), Encrypt(S,PK), and Decrypt(S, i, di, Hdr, PK):

Setup(n) takes the number of users n (number of users in a distribution network) as an input. So n is the maximum number of subscribers for each content. The Setup(n) output n private keys $d_1, \ldots, d_n$ and a public key PK. The Setup(n) is performed in the key server 110.

Encrypt(S,PK) takes the number of subscribers S as an input, S is a subset of users n who has subscribed to a content, $S \subseteq \{1, \ldots, n\}$. Encrypt(S,PK) also takes the public key PK as an input. The Encrypt(S,PK) output a pair of parameters (Hdr, K), whereas Hdr is a header and K is a message encryption key. The Hdr is also known as the broadcast ciphertext. The Encrypt(S,PK) is performed in the encryption server 140.

M is a message to be broadcast to subscribers S. The message M is encrypted into $C_M$ which is the encrypted message. The broadcast to those subscribers S consists of (S, Hdr, $C_M$). The pair of parameters (S, Hdr) is also known as the full header and the encrypted message $C_M$ is also known as the broadcast body.

Decrypt(S, i, di, Hdr, PK) takes the following parameters as inputs: the number of subscribers S, a user ID $i \in \{1, \ldots, n\}$ and the private key di for a user i, a header Hdr, and the public key PK. If a user is a subscriber, then the algorithm outputs the message encryption key K by using all the private information such as the private key di and the public information such as the public key PK. The message encryption key K can then be used to decrypt the encrypted message $C_M$ and obtain the message M.

In a preferred embodiment of the claimed invention, Boneh-Gentry-Waters broadcast encryption is implemented. For the implementation of the Boneh-Gentry-Waters broadcast encryption, a fundamental elliptic curve cryptographic (ECC) algorithm is required. Based on the ECC algorithm, the bilinear group pairing algorithm is implemented. Once the bilinear group pairing algorithm is performed and verified, the Boneh-Gentry-Waters broadcast encryption is implemented using the parameters obtained from all the supporting algorithms such as the ECC algorithm and the bilinear group pairing algorithm. In an embodiment, the aforesaid algorithms may be implemented in C/C++ language as well as x86 and ARM assembly language for optimization. Those algorithms may further be optimized in circuit level to make the operation faster and more efficient. Once the broadcast encryption algorithms are computed, all the related servers mentioned in the claimed invention such as the key server 110 and the encryption server 140 will operate based on the broadcast encryption algorithms in the content distribution network with the P2P architecture. The Setup(n), Encrypt(S,PK), and Decrypt(S, i, di, Hdr; PK) are defined as follows:

Setup(n)

The Setup(n) is performed in the key server 110. Let G be a bilinear group of prime order p. The algorithm first picks a random generator $g \in G$ and a random number $\alpha \in Z_p$. It computes $g_i = g^{(\alpha^i)} \in G$ for $i=1,2, \ldots n, n+2, \ldots, 2n$. Subsequently, it picks a random number $\gamma \in Z_p$ for each content and defines $v = g^\gamma \in G$. The public key is defined to be:

$$PK = (g, g_1, \ldots, g_n, g_{n+2}, \ldots, g_{2n}, v) \in G^{2n+1}.$$

An index i in $\{1, \ldots, n\}$ is mapped to each subscriber. The entitlement database holds the subscriber and set-top box information. Each subscriber and set-top box information corresponds to each index i. A subscriber password is used for authentication and retrieval of $d_i$. The private key for user $i \in \{1, \ldots, n\}$ is defined to be $d_i = g_i^\gamma \in G$. S represents the valid subscribers who currently subscribe to the content. S is also known as the broadcast set. Given that $v = g^\gamma \in G$ as defined previously, $d_i = v^{(\alpha^i)}$.

In yet another embodiment, S can also be larger than the number of current valid subscribers so that when new subscribers join and want to access the content, there is an index in S readily available to be assigned to each new subscriber. This saves the encryption time for user join-in/leave-out session.

Encrypt(S,PK)

The Encrypt(S,PK) is performed in the encryption server 140. A random number t is picked in $Z_p$ and the message encryption key K is defined to be $K=e(g_{n+1},g)^t \in G$. It is possible to compute the value $e(g_{n+1},g)$ as $e(g_n,g_1)$. Subsequently, the header Hdr is defined to be:

$$Hdr = \left(g^t, \left(v \cdot \prod_{j \in S} g_{n+1}, g\right)^t\right) \in G$$

Decrypt(S, i $d_i$, Hdr, PK)

From the encrypted message $C_M$, the header Hdr is found to be Hdr=$(C_0, C_1)$ and since $d_i \in G$, the message encryption key K is obtained from the following algorithm:

$$K = e(g_i, C_1) \Big/ e\left(d_i \cdot \prod_{\substack{j \in S \\ j \neq i}} g_{n+1-j+i}, C_o\right)$$

$$= e(g_{n+1}, g)^t$$

In a further preferred embodiment for an efficient implementation, for any large number of users, the group operations which needs to compute $$\prod_{\substack{j \in S \\ j \neq i}} g_{n+1-j+i}$$

dominates the decryption time because the number of group operations has a size of the size of the subscriber set S minus 2, i.e., |S|−2. For a user, if the value $$w = \prod_{\substack{j \in S' \\ j \neq i}} g_{n+1-j+i}$$

has been previously computed for certain set of users S', the computation of $$\prod_{\substack{j \in S \\ j \neq i}} g_{n+1-j+i}$$

can be implemented with δ group operations using the cached value w, whereas δ is the size of the set difference between S and S'. One set of public values is shared for all content, including $(g, g_1, \ldots, g_n, g_{n+2}, \ldots, g_{2n})$ and $$w = \prod_{\substack{j \in S' \\ j \neq i}} g_{n+1-j+i}.$$

These global public values $(g, g_1, \ldots, g_n, g_{n+2}, \ldots, g_{2n})$ and $$w = \prod_{\substack{j \in S' \\ j \neq i}} g_{n+1-j+i}$$

are distributed by embedding into set-top box at the production site or via another protected channel.

Figure 2:
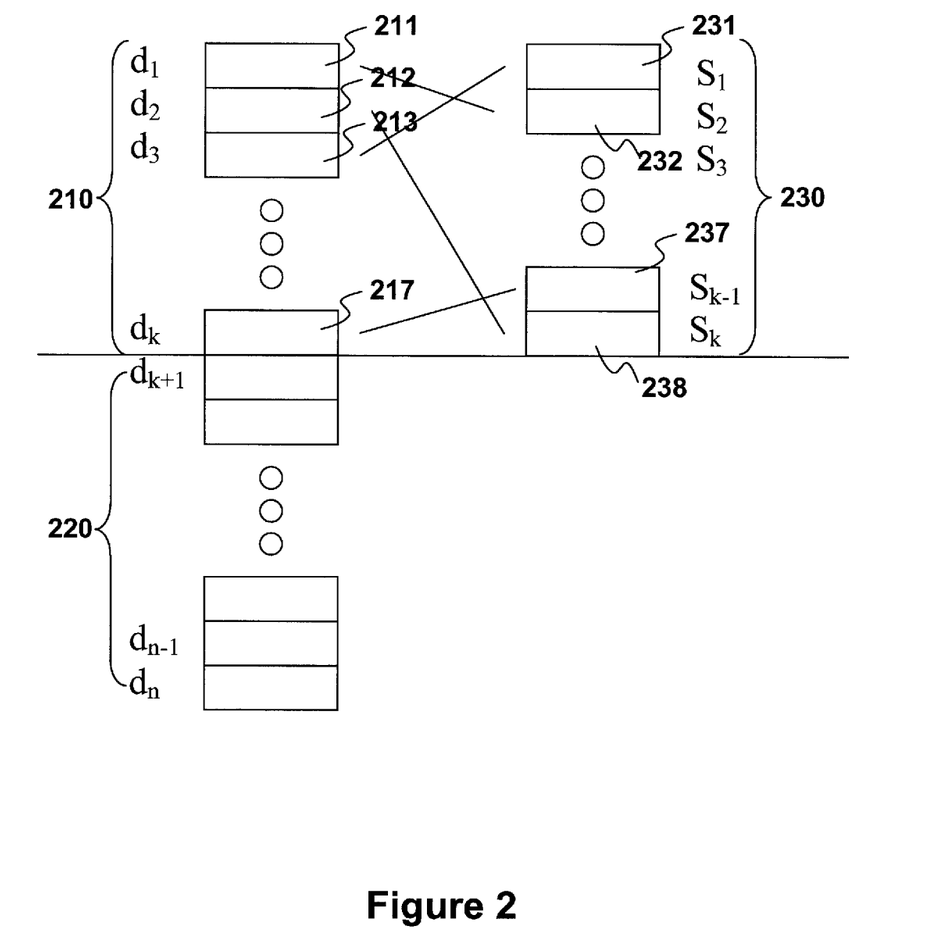
FIG. 2 shows an illustration of key assignment in groups of keys.

FIG. 2 shows the illustration of key assignment in groups of keys. In an embodiment, there are k subscribers 230, denoted by $S_1, S_2, S_3, \ldots S_k$. All k subscribers 230 forms a subscriber set with the content {1, 2, . . . k} which is the index of those private keys being assigned to each subscriber. After a new subscriber joins the distribution network, the subscriber needs to be assigned with a private key so as to access the content. In this embodiment, there are n private keys stored in the key server. All the private keys, denoted by $d_1, d_2, d_3, d_4, \ldots d_k, d_{k+1}, \ldots d_{n-1}, d_n$, are partitioned to different groups, for example, two groups, namely the first group 210 and the second group 220. The first group 210 refers to k private keys, denoted by $d_1, d_2, d_3, d_4, \ldots d_k$. The second group 220 refers to n-k private keys, denoted by $d_{k+1}, \ldots d_{n-1}, d_n$. Initially, only the first group 210 is available for being assigned to subscribers. The assignment of the private keys is performed in a random order, and the new subscriber will be assigned with any private key which has not been assigned yet. Therefore, the assignment may be like this: Subscriber $S_1$ 231 is assigned with a private key $d_3$ 213, subscriber $S_2$ 232 is assigned with a private key $d_1$ 211, subscriber $S_{k-1}$ 237 is assigned with a private key $d_k$ 217, subscriber $S_k$ 238 is assigned with a private key $d_2$ 212, so on and so forth.

Figure 3:
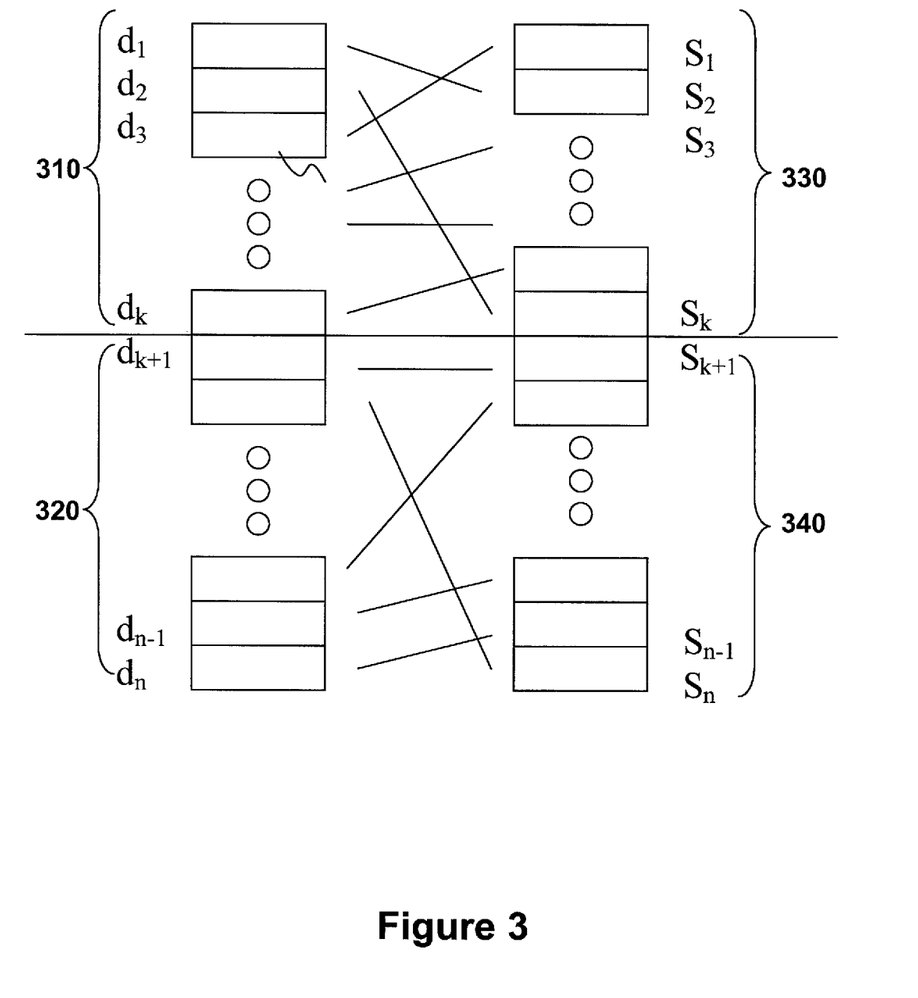
FIG. 3 shows an illustration of key assignment in groups of keys.

FIG. 3 shows the illustration of key assignment in groups of keys. In one embodiment, the private keys are masked with a subscriber masks. Under this scenario, the k private keys in the first group 310, denoted by $d_1, d_2, d_3, d_4, \ldots d_k$, have all been assigned to k subscriber in the first subscriber set 330, denoted by $S_1, S_2, S_3, \ldots S_k$. Then any new subscribers, for example those in the second subscriber set 340, denoted by $S_{k+1}, \ldots S_{n-1}, S_n$, will be assigned to those private keys in the second group 320. Consequently, private keys in the key server were assigned to new subscribers in a way that private keys from the same group will be used before using those from another group.

Figure 4:
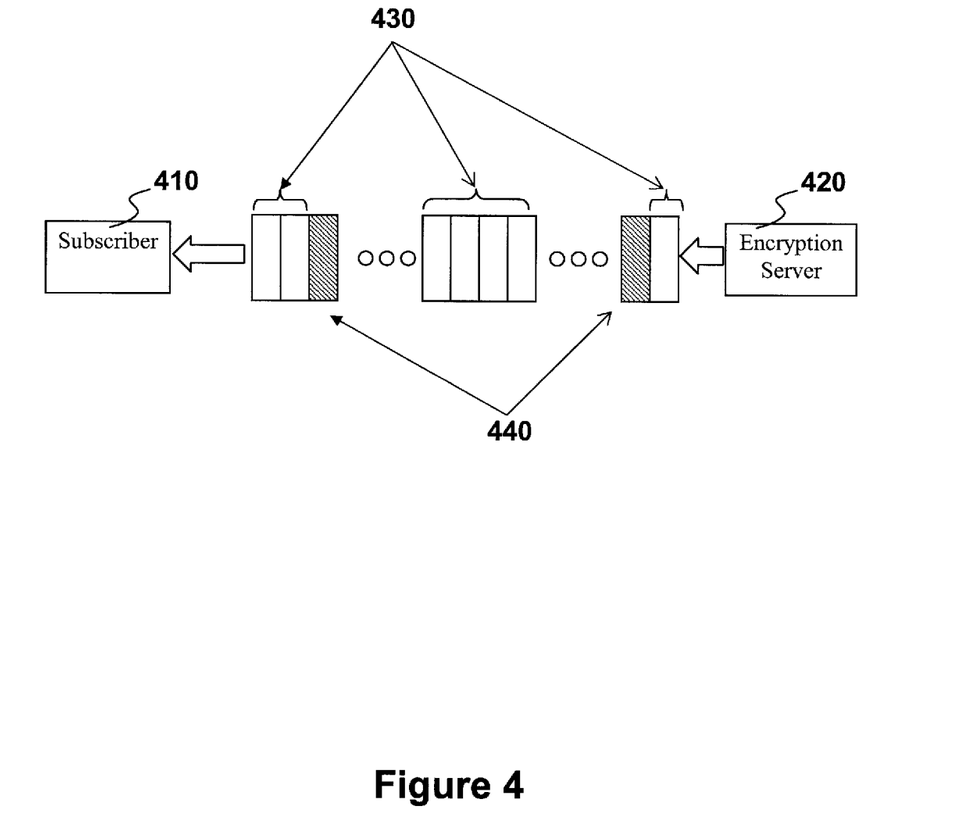
FIG. 4 shows an illustration of distributing public values in-band, interleaving with content.

FIG. 4 shows the illustration of distributing public values in-band, interleaving with encrypted content. Public values 440 are transferred from an encryption server 420 to a subscriber 410. In the meantime, the encrypted content 430 are also transferred from the encryption server 420 to the subscriber 410. The public values 440 are transferred together with the encrypted content 430 in the same channel by interleaving the public values 440 with the encrypted content 430. For example, at certain time slots, the public values 440 were sent to the subscriber in the network while at another time slots, the encrypted content 430 were sent to the subscriber in the network.

Figure 5:
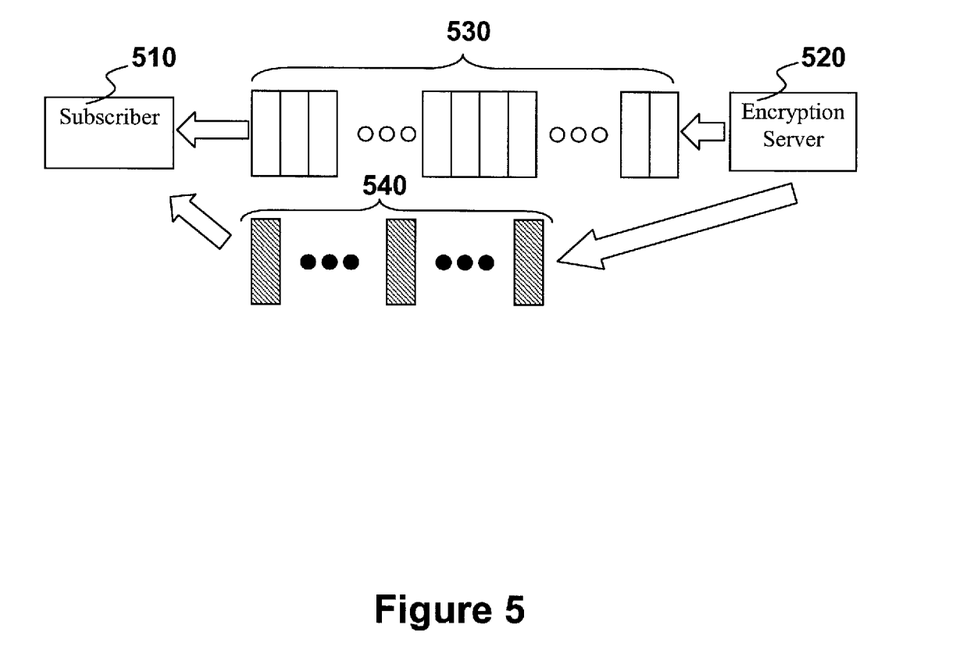
FIG. 5 shows an illustration of distributing public values through out-of-band channel.

FIG. 5 shows the illustration of distributing public values through out-of-band channel. Public values 540 were transferred from an encryption server 520 to a subscriber 510. In the meantime, the encrypted content 530 were also transferred from the encryption server 520 to the subscriber 510. Different channels are used to transfer the public values from the encryption server 520 to the subscriber 510. Consequently, at any time instance, the public values 540 and the encrypted content 530 may be sent to the subscriber simultaneously through different paths in the network.

Figure 6:
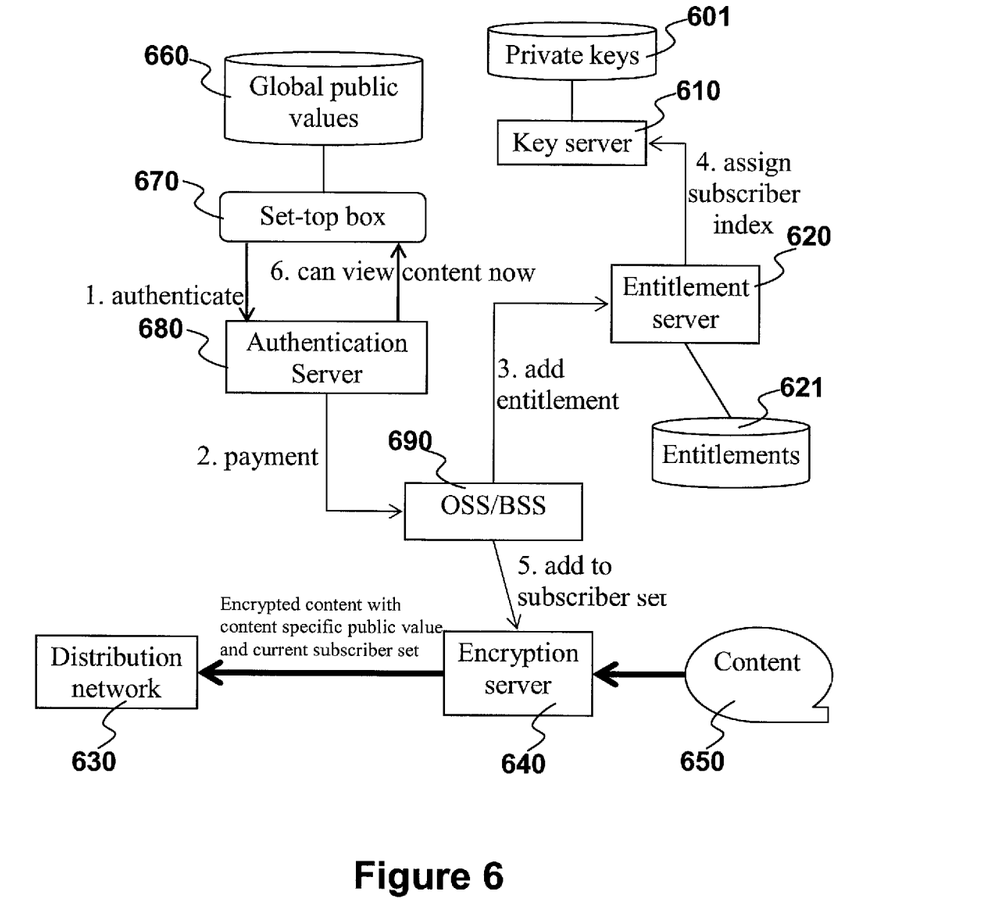
FIG. 6 shows a block diagram of subscribing to content.

FIG. 6 shows a block diagram of subscribing to content. In an embodiment, the global public values 660 including (g, $g_1, \ldots, g_n, g_{n+2}, \ldots, g_{2n}$) and $$w = \prod_{\substack{j \in S' \\ j \neq i}} g_{n+1-j+i}$$

are stored in the set-top box 670. To subscribe to the content 650, user or set-top box needs to authenticate himself and/or itself to the system by his/its password. After the authentication is completed by an authentication server 680 and payment is done by a payment server (not shown), the payment record is passed to an OSS (Operation Support System) or BSS (Billing Support System) 690 to indicate the corresponding subscription. The OSS/BSS 690 informs an entitlement server 660 to add the new subscriber for access to the content 650. The additional entitlement for the new subscriber is added to the existing entitlements 621 maintained by the entitlement server 620. The entitlement server 620 assigns a new private key for the content in the key server 610. The OSS/BSS 690 also informs the encryption server 640 to use the new subscriber set after assigning a subscriber index to the existing subscriber set. According to the subscriber index/the new subscriber set, a private key for the new subscriber is generated or if it has been stored by the key server 610 as existing private keys 601, the private key is obtained from the key server 610 and is allowed to be obtained for authenticated subscribers. The encryption server 640 gets the new subscriber set from entitlement server 620 to encrypt the content 650. Then the encrypted content with content specific public value and current subscriber set is sent to the distribution network 630 from the encryption server 640. In one embodiment, when the encrypted content is transferred together with content specific public value, the encrypted content is interleaved with the content specific public value in the same channel. In another embodiment, the encrypted content may be separately sent to the distribution network 630 from the encryption server 640. The encrypted content is sent in an out-of-band channel so that it is a channel different from the one for sending the content specific public value.

Figure 7:
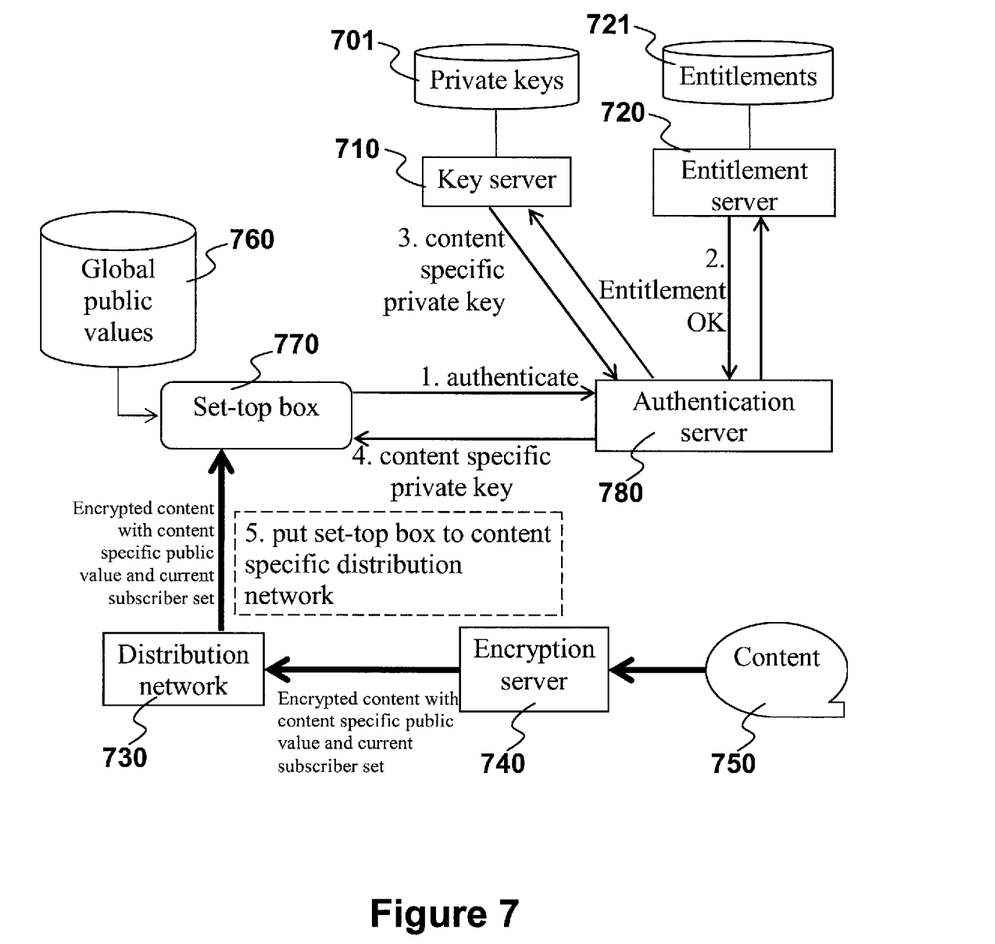
FIG. 7 shows a block diagram of accessing content.

FIG. 7 shows a block diagram of accessing content. The user or set-top box 770 needs to authenticate himself and/or itself to the system before being granted an access to the content 750. It is possible to authenticate the user and/or the set-top box 770 by providing a password to the authentication server 780. There is a data storage means in the set-top box 770. All the global public values 760 are stored in the storage means in the set-top box 770. Once authenticated, the authentication server 780 checks if the user or set-top box 770 has subscribed to the content 750 by communicating with the entitlement server 720. The entitlement server 720 maintains a database which stores all the entitlements 721 registering the current subscription status for each content. If the user or set-top box 770 is entitled to access the content, the authentication server 780 obtains the user specific private key from the key server 710 which generates private keys 701 for each content. In an embodiment, there is a set of private keys for each content, a user or set-top box 770 uses one of them according to the subscriber index assigned and releases the private key for others to use after use. The authentication server 780 returns the user specific private key to the user or set-top box 770. The authentication server also put the set-top box 770 into the proper distribution network 730 which is distributing the content 750. The content 750 which is distributed by the distribution network 730 is encrypted by the encryption server 740. Therefore, what the user or set-top box 770 obtains from the distribution network 730 is the encrypted content with content specific public value and current subscriber set.

Figure 8:
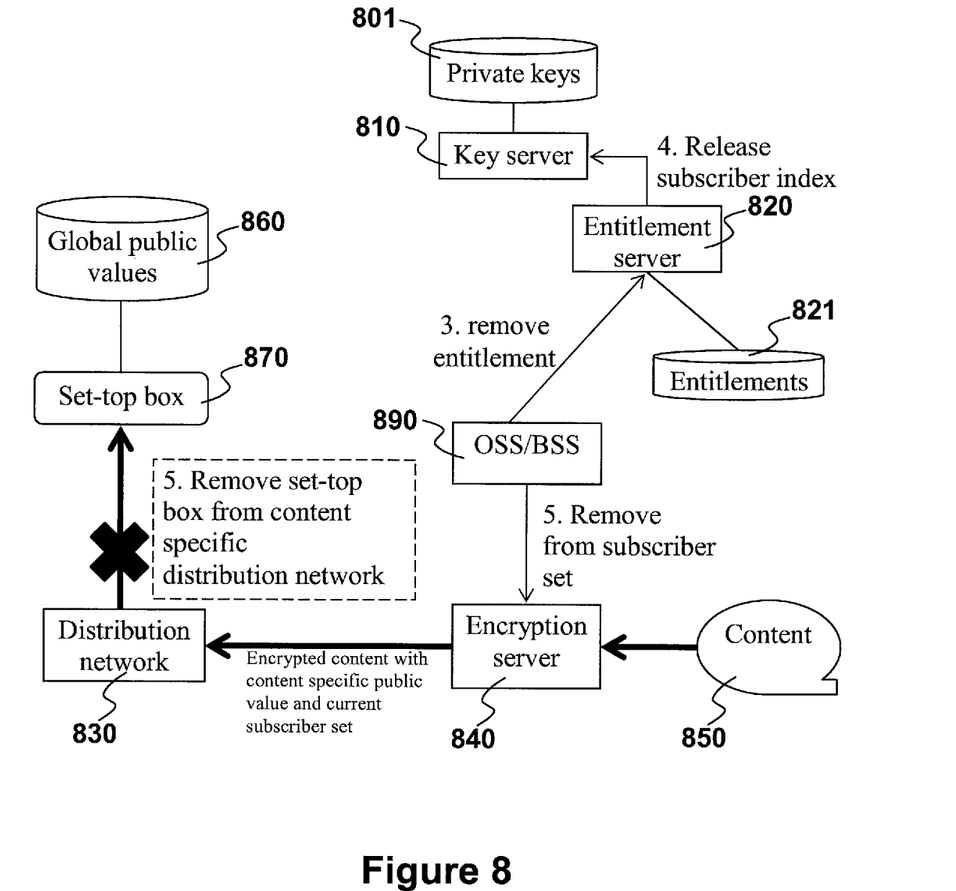
FIG. 8 shows a block diagram of invalidating an access to the content by a user or set-top box.

FIG. 8 shows a block diagram of invalidating an access to the content 850 by a user or set-top box 870. Upon some predetermined criteria subject to business requirements, for example, after a certain number of days, the user or set-top box 870 is no longer allowed to access the content 850. The entitlement server 820 contains a database of entitlements 821. The OSS/BSS 890 removes the user or set-top box 870 from the subscriber set and removes the entitlement of the user or set-top box 870 from the entitlement server 820. The encryption server 840 encrypts the content 850 to provide encrypted content with content specific public value. The encryption server 840 further provides the current subscriber with the user or set-top box 870 removed. The key server 810 contains a database of private keys 801. The corresponding assignment of the content specific private key is also removed. The OSS/BSS also removes the user or set-top box 870 from accessing the content specific distribution network. The subscriber index used by the user or set-top box 870 is released by the entitlement server 820 so that such subscriber index is now available for use by others.

Figure 9:
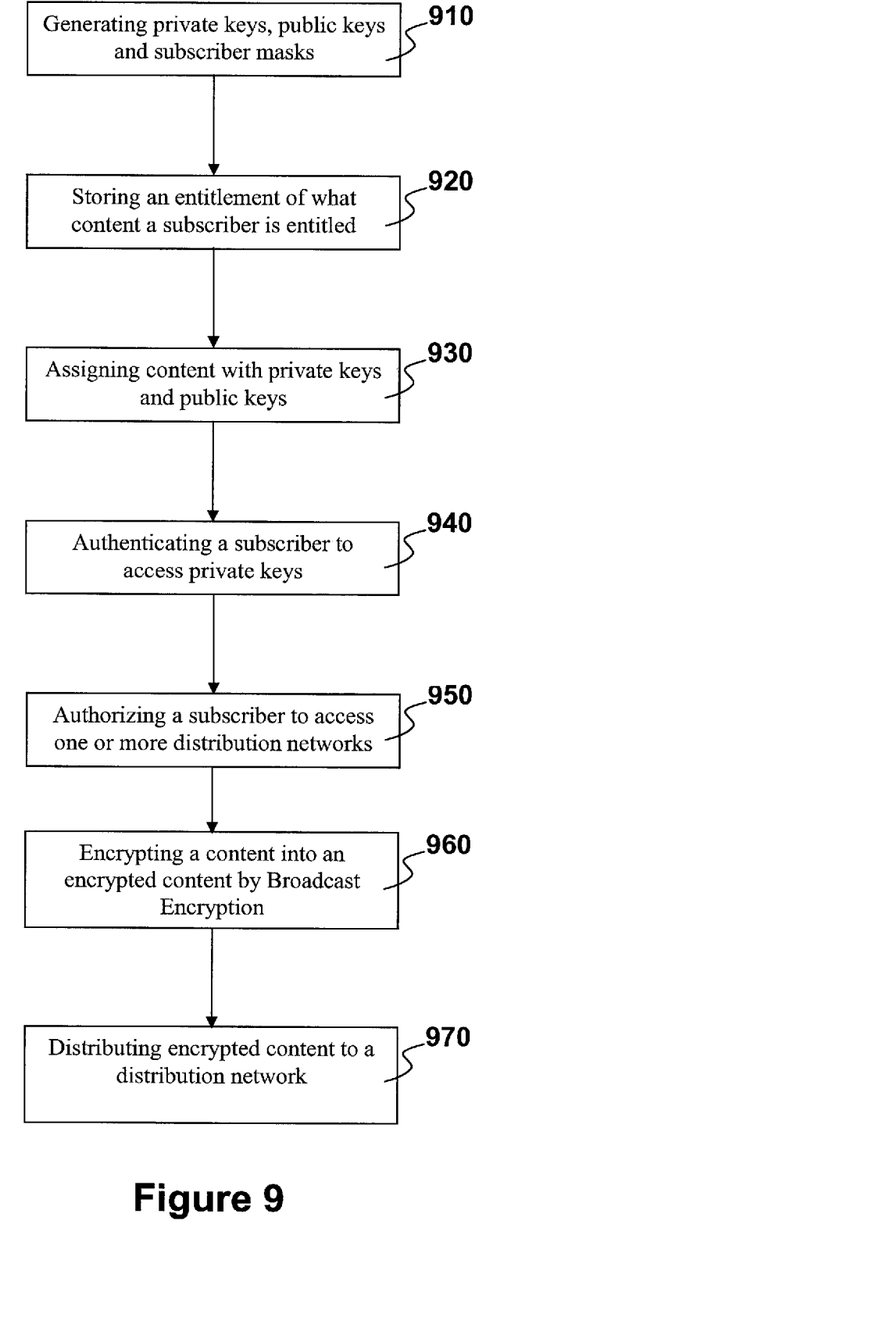
FIG. 9 shows a flow chart of distributing real time streaming content.

FIG. 9 shows a flow chart of content distribution with broadcast encryption. In a generating step 910, private keys, public keys and subscriber masks are generated by a key server. In a storing step 920, an entitlement of what content a subscriber is entitled is stored. In an assigning step 930, a content is assigned with a set of a public key and a private key for each specific subscriber. The public key is thus also known as content specific public key. The private key is thus also known as content specific private key. The content specific private key is provided to a subscriber after he is authenticated by an authentication server in an authenticating step 940. The authentication server may also require the subscriber to pay first before authenticating the subscriber and have the payment transaction recorded by a payment server. The generation of the content specific private key is performed according to the broadcast encryption. In an embodiment, the broadcast encryption is Boneh-Gentry-Waters broadcast encryption and the encryption method is described as above. The content specific private key is generated by the key server according to the subscriber index assigned by the entitlement server. In an authorizing step 950, the authorization server will assign a subscriber to one or more distribution networks. In an encryption step 960, the content is encrypted by the broadcast encryption. After the subscriber subscribes to the content, the entitlement server makes an operation support system send an updated subscriber set to the encryption server. If the subscriber is no longer subscribed to the content, the corresponding subscriber index will be released by the key server and the subscriber set to the encryption server will also be updated. In a distributing step 970, the encrypted content is distributed with a current subscriber set and a content specific public value to the distribution network. In an embodiment, the distribution network is a peer-to-peer network. The current subscriber set and the content specific public value are distributed via in-band interleaving with the encrypted content. In another embodiment, the current subscriber set and the content specific public value are distributed via out-of-band interleaving, for example, by a session description protocol or in a separate authenticated channel. In yet another embodiment, the content specific public value are embedded in the set-top box while the current subscriber set are distributed via either in-band interleaving or out-of-band interleaving.

Figure 10A:
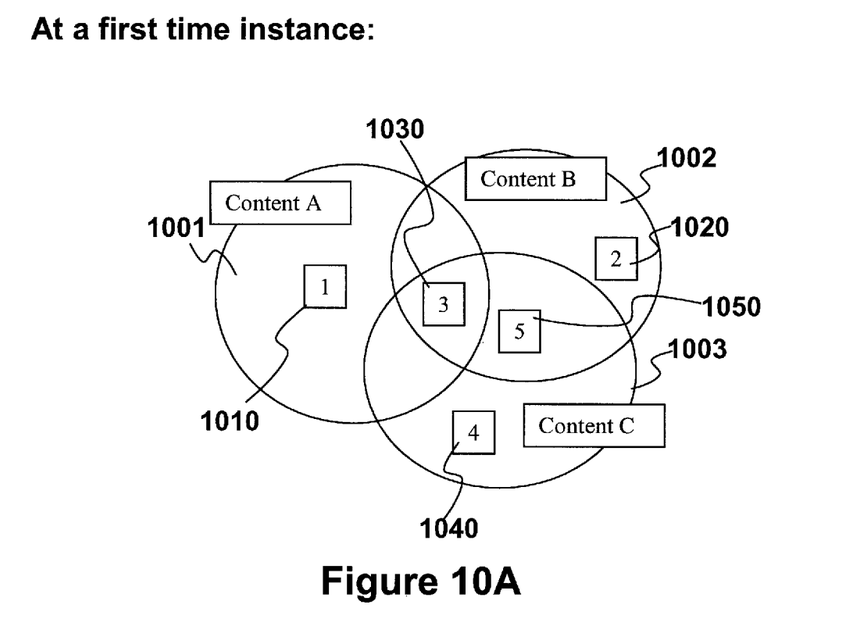
FIG. 10A shows an illustration of dynamically assigning subscribers to different distribution networks.

FIG. 10A shows an illustration of dynamically assigning subscribers to different distribution networks. At a first time instance, different subscribers are assigned to different content specific distribution networks according to their entitlements. Subscriber 1 1010 is entitled to content A and is allowed to access the distribution network of content A 1001. Subscriber 2 1020 is entitled to content B and is allowed to access the distribution network of content B 1002. Subscriber 3 1030 is entitled to content A, content B, content C and is allowed to access the distribution network of content A 1001, the distribution network of the content B 1002, the distribution of content C 1003. Subscriber 4 1040 is entitled to content C and is allowed to access the distribution network of content C 1003. Subscriber 5 1050 is entitled to content B, content C and is allowed to access the distribution network of content B 1002, the distribution network of content C 1003.

Figure 10B:
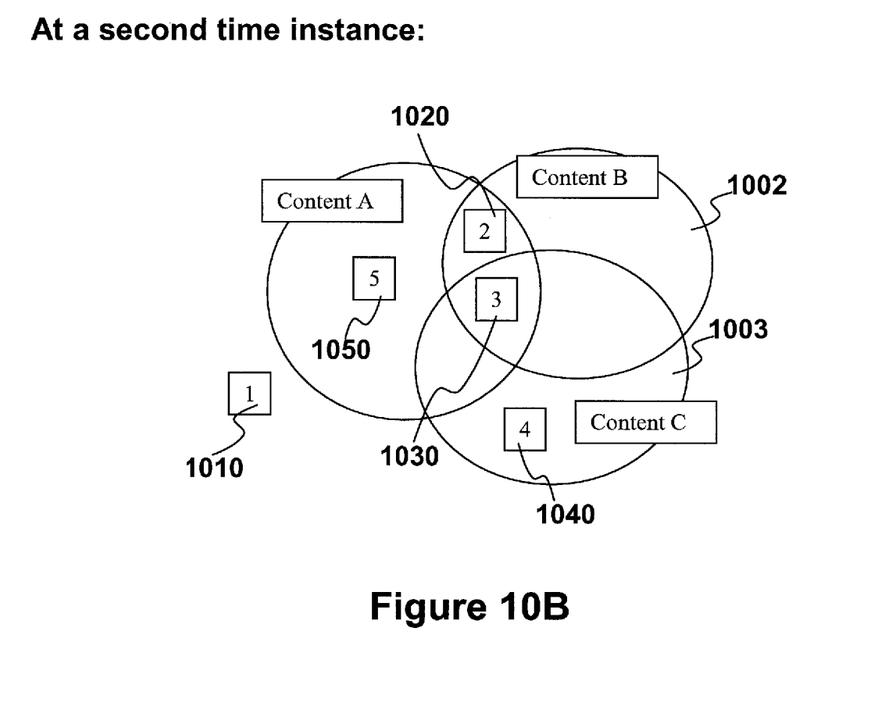
FIG. 10B shows an illustration of removing subscribers from the distribution networks when their entitlements are no longer valid.

FIG. 10B shows an illustration of removing subscribers from the distribution networks when their entitlements are no longer valid. Subscribers will be forced to leave the distribution network when their entitlement is invalidated. This is to provide additional security of the whole system. For example, at a second time instance, subscriber 1 1010 is entitled to no content and the access to any distribution network is removed. Subscriber 2 1020 is entitled to content A, content B and is allowed to access the distribution network of content A 1010, the distribution network of content B 1020. Subscriber 3 1030 is entitled to content A, content B, content C and is allowed to access the distribution network of content A 1001, the distribution network of content B 1002, the distribution network of content C 1003. Subscriber 4 1040 is entitled to content C and is allowed to access the distribution network of content C 1003. Subscriber 5 1050 is entitled to content A and is allowed to access the distribution network of content A 1001.

The description of preferred embodiments of this claimed invention are not exhaustive and any update or modifications to them are obvious to those skilled in the art, and therefore reference is made to the appending claims for determining the scope of this claimed invention.

INDUSTRIAL APPLICABILITY

The claimed invention has industrial applicability in digital rights management. It is possible to implement the claimed invention for content distribution in distribution networks, real time content streaming and distributing content in a P2P network. It provides a way to perform the assignment of distribution network according to the content.

We claim:

1. A content distribution method with broadcast encryption in a content distribution network, comprising:
   executing a setup process by one or more computer server processors presiding at the content distributor, wherein the setup process comprising:
      receiving a clear content to be encrypted and distributed;
      creating a content specific public value based on the clear content received;
      generating a content specific public key using the content specific public value;
      generating one or more content specific private keys using the content specific public value; and
      assigning the content specific public key and the one or more content specific private keys to the clear content;
      wherein the content specific public key and the one or more content specific private keys are specific to the clear content;
   recording one or more new subscribers' payment transactions by one or more computer server processors;
   adding the one or more new subscribers to a subscriber set, wherein the subscriber set being a list of user identifiers of those users in the content distribution network who subscribe to the clear content;
   authenticating and authorizing subscribers in the subscriber set and assigning one of the one or more content specific private keys to each of successfully authenticated and authorized subscribers by one or more computer server processors presiding at the content distributor, wherein content entitlement information is used in authenticating and authorizing the subscribers, wherein the authenticating and authorizing of subscribers being performed before content distribution;
   executing an encryption process by the one or more computer server processors presiding at the content distributor, wherein the encryption process comprising:
      generating a first message encryption key and a broadcast ciphertext using the content specific public key and the subscriber set; and
      encrypting the clear content into an encrypted content using the first message encryption key;
   distributing the broadcast ciphertext, the subscriber set, the content specific public key, and the encrypted content to the users via the content distribution network; and
   executing a decryption process on the encrypted content by one or more processors presiding at each of the subscribers, wherein the decryption process comprising:
      generating a second message encryption key using the broadcast ciphertext and the subscriber set received, and the content specific private key of the subscriber; and
      decrypting the encrypted content received using the second message encryption key.

2. The method of claim 1, wherein Boneh-Gentry-Waters encryption scheme is used to generate the content specific public key, the one or more content specific private keys, the first message encryption key, and the first message encryption key.

3. The method of claim 1, wherein the content distribution network is a peer-to-peer network.

4. The method of claim 1, wherein the one or more content specific private keys are grouped into one or more groups.

5. The method of claim 4, wherein a new subscriber is assigned one of content specific private key from another group from the one or more groups after all content specific private keys of one group have been assigned.

6. The method of claim 1, wherein the content specific public value being a random prime number.

7. The method of claim 1, wherein the content specific public value is distributed to the users in an in-band interleaving manner with the encrypted content.

8. The method of claim 1, wherein the content specific public value is distributed to the users in an out-of-band interleaving manner with the encrypted content using a session description protocol.

9. The method of claim 1, wherein the content specific public value is distributed to the users in an out-of-band interleaving manner with the encrypted content using a separate authenticated channel.

10. A content distribution system with broadcast encryption, comprising:
    one or more computer server processors presiding at the content distributor configured to execute a setup process, the setup process comprising:
       receiving a clear content to be encrypted and distributed;
       creating a content specific public value based on the clear content received;

generating a content specific public key using the content specific public value;

generating one or more content specific private keys using the content specific public value; and assigning the content specific public key and the one or more content specific private keys to the clear content;

wherein the content specific public key and the one or more content specific private keys are specific to the clear content;

the one or more computer server processors further configured to record one or more new subscribers' payment transactions;

the one or more computer server processors further configured to add the one or more new subscribers to a subscriber set, wherein the subscriber set being a list of user identifiers of those users in the content distribution network who subscribe to the clear content;

the one or more computer server processors further configured to authenticate and authorize subscribers in the subscriber set and to assign one of the one or more content specific private keys to each of successfully authenticated and authorized subscribers, wherein content entitlement information is used in authenticating and authorizing the subscribers, wherein the authenticating and authorizing of subscribers being performed before content distribution;

the one or more computer server processors further configured to execute an encryption process, wherein the encryption process comprising:

generating a first message encryption key and a broadcast ciphertext using the content specific public key and the subscriber set; and encrypting the clear content into an encrypted content using the first message encryption key;

the one or more computer server processors further configured to distribute the broadcast ciphertext, the subscriber set, the content specific public key, and the encrypted content to the users via the content distribution network; and one or more client processors presiding at each of the subscribers configured to execute a decryption process on the encrypted content, wherein the decryption process comprising:

generating a second message encryption key using the broadcast ciphertext and the subscriber set received, and the content specific private key of the subscriber; and decrypting the encrypted content received using the second message encryption key.

11. The system of claim 10, wherein Boneh-Gentry-Waters encryption scheme is used to generate the content specific public key, the one or more content specific private keys, the first message encryption key, and the first message encryption key.

12. The system of claim 10, wherein the content distribution network is a peer-to-peer network.

13. The system of claim 10, wherein the one or more content specific private keys are grouped into one or more groups.

14. The system of claim 13, wherein a new subscriber is assigned one of content specific private key from another group from the one or more groups after all content specific private keys of one group have been assigned.

15. The system of claim 10, wherein the content specific public value being a random prime number.

16. The system of claim 10, wherein the content specific public value is distributed to the users in an in-band interleaving manner with the encrypted content.

17. The system of claim 10, wherein the content specific public value is distributed to the users in an out-of-band interleaving manner with the encrypted content using a session description protocol.

18. The system of claim 10, wherein the content specific public value is distributed to the users in an out-of-band interleaving manner with the encrypted content using a separate authenticated channel.

19. The system of claim 10, wherein the one or more computer server processors are further configured to generate a subscriber mask for each of the one or more subscribers for masking its assigned content specific private key.

20. The system of claim 10, wherein the one or more computer server processors are further configured to record one or more payment transactions; and wherein the system further comprising an operation support system for receiving the one or more payment transactions recorded.

* * * * *